March 20, 1951

I. G. MALOFF 2,545,525

HOUSING AND MOUNTING FOR ELEMENTS OF
SCHMIDT TELEVISION PROJECTOR

Filed Aug. 29, 1945

Inventor
Ioury G. Maloff

H. G. Grover
Attorney

March 20, 1951  I. G. MALOFF  2,545,525
HOUSING AND MOUNTING FOR ELEMENTS OF
SCHMIDT TELEVISION PROJECTOR
Filed Aug. 29, 1945  3 Sheets-Sheet 2

Inventor
IOURY G. MALOFF
BY H. G. Grover
Attorney

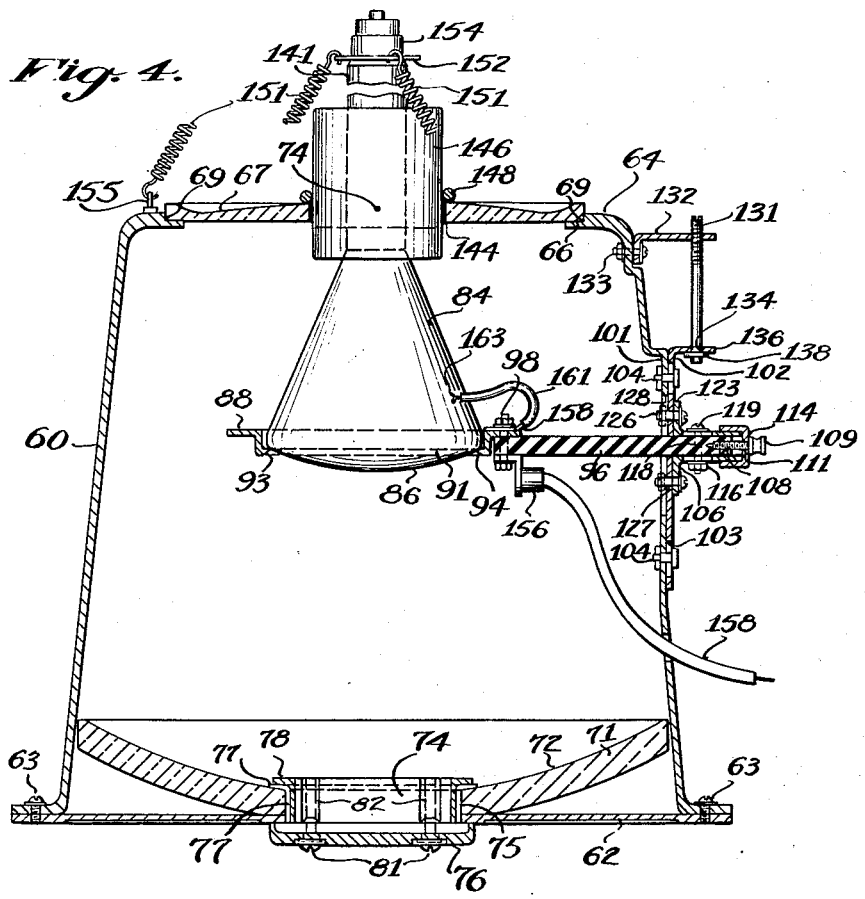
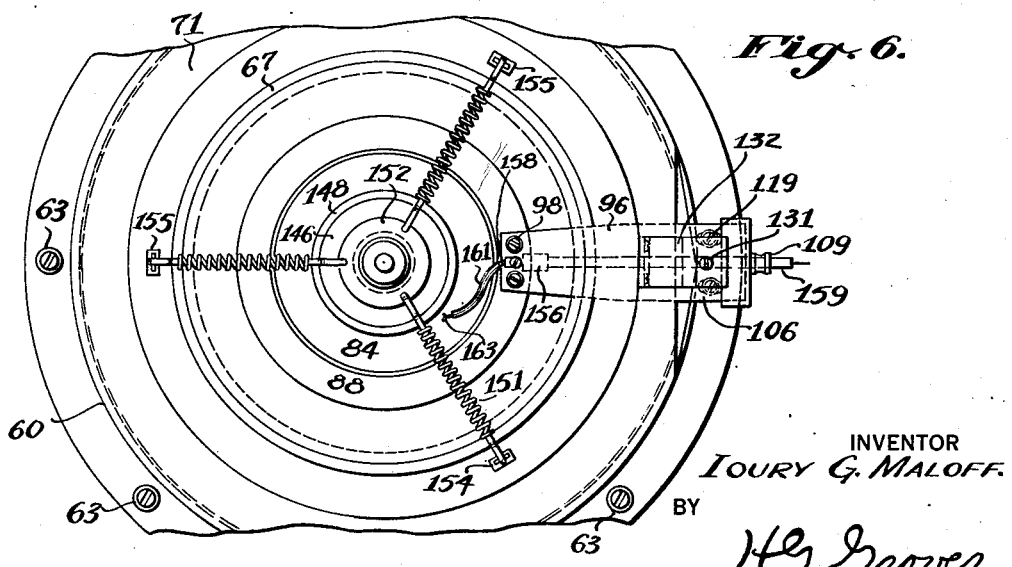

Patented Mar. 20, 1951

2,545,525

UNITED STATES PATENT OFFICE 2,545,525

HOUSING AND MOUNTING FOR ELEMENTS OF SCHMIDT TELEVISION PROJECTORS

Ioury G. Maloff, Camden, N. J., assignor to Radio Corporation of America, a corporation of Delaware Application August 29, 1945, Serial No. 613,331

5 Claims. (Cl. 177—319)

The present invention relates to a system for projecting images produced by the cathode ray tube of a television receiver, and more particularly, though not necessarily exclusively, to the respective positioning of the optical elements and an electron image device having an active target area in such a system. The invention has special reference to the provision of an improved method of and means for positioning the active target area of a television image projection tube with respect to the optical elements of the image projector which comprise a spherical mirror and an aspherical correcting plate.

The present application is a continuation in part of my earlier copending application Serial No. 512,307, now abandoned, filed November 30, 1943.

In United States Patent No. 2,273,801, granted February 17, 1942, to D. O. Landis, there is disclosed an arrangement whereby a spherical mirror, or spherical reflecting surface, is arranged to direct and focus light rays from the television image upon a viewing screen with the aid of an aspherical correcting plate or correcting lens. The organization of the principal optical parts shown in this Landis patent, for best results, must be aligned and spaced in a certain definite relation within very close tolerance limits. Careful consideration is called for in the mechanical construction of the mounting which supports and positions the cathode ray tube with respect to the principal optical parts of the projector. The primary aim, therefore, of this invention is to provide a novel mounting combination comprising a barrel member or housing which supports the previously mentioned optical parts; and which also includes a provision for adjustably mounting a cathode ray tube in the combination in a novel manner, whereby it may be readily replaced by other tubes of like geometrical form without disturbing the alignment of the combination.

The combination referred to above as constituting an important consideration in carrying out the invention must fulfill a number of requirements. To enumerate some of the most important requirements:

Since the position of the correcting lens with respect to the spherical mirror is rather critical, the mounting combination must provide initially for positive and simple alignment.

The mounting combination preferably should include provisions for dust-proofing, since accumulation of dust on the mirror or correcting lens reduces both the contrast and the illumination. Moreover, frequent dusting would be detrimental to the active optical surfaces involved.

The housing combination preferably should be electrically shock-proof since in some cases final optical focusing of the image on the associated viewing screen must be done with the cathode ray tube active electrically and consequently with high voltage applied to at least some of its electrodes.

The major supporting member, or housing, preferably should be of metal to cut off X-rays generated by the cathode ray tube. These X-rays are very soft and weak but nevertheless they are measurable and screening protection is desirable.

The housing combination must provide for positive and convenient initial adjustments of the target face of the tube along three rectangular coordinates; one of which coincides with the optical axis of the system.

The housing combination preferably should provide for easy tube replacement by unskilled members of the general public.

Finally, the housing combination preferably should be designed readily to lend itself to such inexpensive manufacturing processes as stamping or die casting, involving a minimum of machining. An important requirement of general sturdiness is met by the mounting combination of this invention, so that there will be no deformation of the parts in transportation and during years of service.

Another object of the invention, therefore, is to provide a novel mounting combination which will fulfill any or all of the requirements and meet the conditions set forth above.

With reference to the mounting of the cathode ray tube which is used in combination with the previously mentioned optical parts in a special manner, it is to be noted that the tube face is of spherical configuration, so that it may operate optically in a satisfactory manner with a spherical mirror having a given radius of curvature. The tube face, in fact, is the object field of the system, and when the image field, that is to say, the viewing screen, is flat, the tube face must be curved. The tube face would ideally be an ellipsoid for finite throw. However, the tube face may be made spherical with a radius of curvature substantially equal to that of the focal length of the system. A minimum of three points may be selected which lie on the curved surface presented by the tube face when it is in proper position with respect to any or all of the optical elements of the system. Therefore, with these three points, or alternatively, an infinite number of points provided by a ring, determined, then any tube having a facial configuration suiting it for use with a particular optical system may be placed in position on the three or more points and its correct alignment with respect to the principal optical elements of the projector is automatic. The position of other portions of the tube between its ends, such as the tube neck, is relatively unimportant when the tube is located in accordance with the invention in the manner just stated. This constitutes an important advantage over tube mounting systems where the tube is held at some portion between its ends.

Accordingly, it is a further object of the invention to provide a novel mounting arrangement for a cathode ray tube in combination with the optical elements of an image projection system.

A still further object of the invention is to provide a novel mounting for a cathode ray tube in an image projection system whereby replacement of the tube in the system may be made with a minimum of effort and with complete assurance that the tube will be properly aligned with respect to other cooperating elements of the system.

A still further object of the invention is to provide an electrically safe image projection system including a cathode ray tube having high operating voltages supplied thereto.

A still further object of the invention is to provide for X-ray shielding in connection with an image projection system including a cathode ray tube.

A still further object of the invention is to provide a television projection system which is substantially dust-proof, thereby to protect the active optical surfaces which are employed.

Other objects and advantages of the invention will, of course, become apparent and immediately suggest themselves to those skilled in the art to which the invention is directed from a reading of the following specification in connection with the accompanying drawings in which:

Fig. 4 is an elevational view, partly in section, of an image projection system constructed in accordance with the invention in one of its more preferred forms;

Fig. 6 is a view in plan of the projection system of Fig. 4.

While the invention is illustrated and described in connection with a television image projection system, it will be understood that its use is more general. For example, it may be used in a projection oscillograph or other physical instrument.

Figure 1:
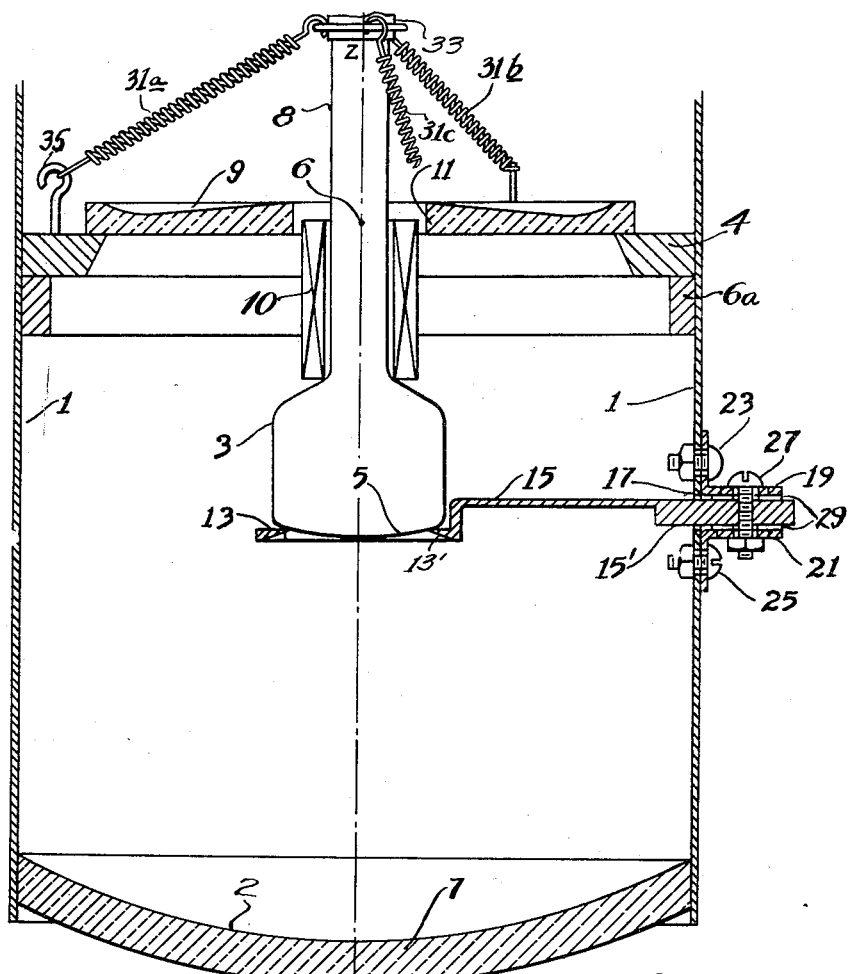
Fig. 1 is a vetrical, sectional view of one form of mounting combination in accordance with the invention.
Figure 2:
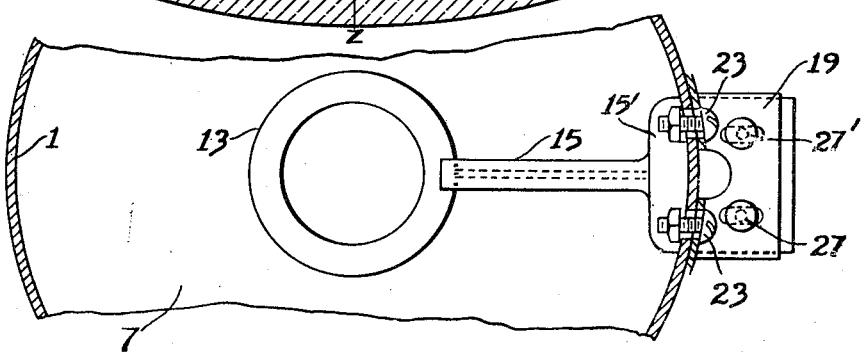
Fig. 2 is a plan view in section showing a portion of the mounting combination of Fig. 1.

In the embodiment of Figs. 1 and 2, reference numeral 1 designates a cylindrical shield or housing of metal, for example, which serves as the principal supporting member of the mounting combination of this invention. An electronic image producing tube 3, which has a television image produced on its curved luminescent target 5, projects the television image along an optical path toward a reflecting element 7 which has a spherical reflecting surface 2. The target face 5 of the tube 3 will be a surface of revolution, and it may be exactly spherical in some cases. This circumstance affords a basis for the novel tube mounting feature of the invention whereby the target area 5 of the tube is disposed in its correct optical relationship with respect to the spherical reflecting surface 2.

An aspherical correcting plate or correcting lens 9 is positioned to receive the light reflected from the reflecting surface 2. This correcting plate is figured to correct any spherical aberration introduced into any of the light rays by the reflecting surface 2 of the member 7, so that a sharply focused reproduction of the image developed on the luminescent or fluorescent area 5 of the tube 3 is produced on the previously mentioned viewing screen (not shown).

The correcting lens 9 is seated upon, or mounted within, a correcting lens holder 4 which is secured in position at, or adjacent to, one end of the cylindrical member 1. A ring 6a assists in maintaining the member 4 in a plane which is at right angles to the axis of the cylindrical member 1. It will be noted that the correcting lens 9 is located by the means just described at the center of curvature 6 of the spherical reflecting surface 2. The correcting plate 9 is provided with a central aperture 11 through which the neck portion 8 of the tube 3 projects. Also, the usual deflecting yoke, indicated by reference character 10, may be accommodated by the aperture 11 when the yoke is mounted close to the bulb portion of the tube.

Since the target face 5 of the image tube 3 is spherical, as stated above, in carrying the invention into effect this target area 5 is supported at a number of circumferentially distributed points about the spherical target area 5.

Thus, as shown in both Figs. 1 and 2, it may be supported at an infinite number of circumferentially distributed points, as upon a narrow annulus or ring 13, having an inside diameter substantially equal to the diagonal of the image-bearing portion or target face 5 of the tube.

Figure 3:
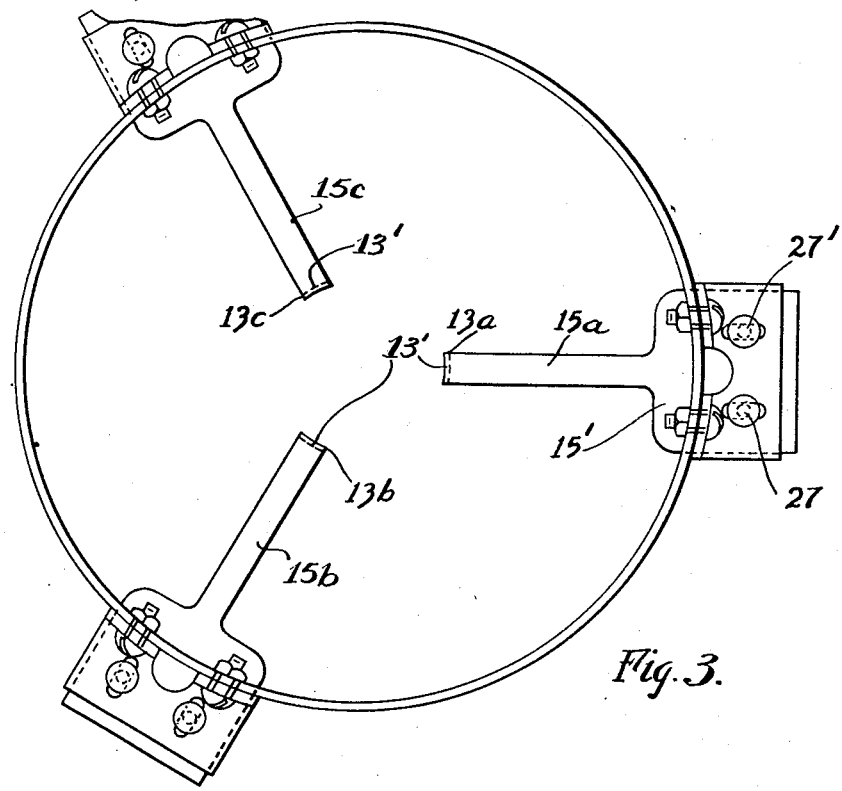
Fig. 3 is a plan view in section showing a modified tube support for use with the invention.

Alternatively, as illustrated by the modification of Fig. 3, the number of circumferentially distributed points 13a, 13b, 13c upon or at which the tube is supported may comprise the minimum number of points required to define a plane, i. e., three. In both cases, the support 13 (Fig. 1), 13a etc. (Fig. 3), is preferably beveled outwardly as indicated at 13' with respect to the axis of symmetry Z—Z of the system, so that the presence of the support at the target face 5 of the tube 3 in no wise affects the transmission of light therefrom.

In both cases (i. e., Figs. 1 and 3), when the support is correctly aligned, originally, any tube mounted in the manner above described and having the correct radius of curvature will be in proper alignment with respect to focus, irrespective of the over-all length dimension of the tube and substantially irrespective of the relative angular position of the longitudinal axis of the tube with respect to the optical axis of the system.

In order to permit the ring 13 or other equivalent supports in accordance with the invention for the tube 3 to be correctly aligned in the original installation, I provide means for adjusting its position in three mutually perpendicular directions. To this end, I may mount the tube support, per se, upon a mechanical spider though, in the case of the ring support (Figs. 1 and 2), I prefer to employ a single adjustable support in the form of an arm 15 and, in the case of the three-point support of Fig. 3, three adjustable arms, 15a, 15b, 15c. In either event, since the supports (15, 15a, 15b, etc.) are mounted on the object side of the mirror, I may make them of tapered or rectangular cross-section and may arrange them with the thinner edge or narrower side parallel to the axis of symmetry Z—Z of the system, so as to minimize light losses.

As previously indicated, the area 5 of the image tube 3 must be mounted with a high degree of accuracy with respect to the spherical reflective surface 2 of the mirror 7. Accordingly, a support is provided in accordance with the invention which is capable of such a degree of adjustment. Since the adjustable supports for the arm 15 of Fig. 1 or the arms 15a, 15b, etc. of Fig. 3 are of like construction, a description of one support will serve as a description of all.

It will be observed upon inspection of Fig. 2 that the arm 15, to which the ring 13 is attached, terminates adjacent to its outer end in a wide arm end or flat portion 15' and that the said flat end-portion extends through an aperture 17 (Fig. 1) in the casing 1. This aperture 17 is sufficiently large to permit the arm-end 15' to be moved at least a limited distance both vertically and laterally. Two flanges 19 and 21, which are secured to the outer surface of the casing 1 by separate pairs of bolts 23 and 25, are arranged opposite the "top" and "bottom" surfaces, respectively, of the arm-end 15', and serve as the jaws of a clamp through which a clamping force may be applied to the said arm-end through a pair of screws or bolts 27, 27' which extends through all three of the parts 19, 15', and 21.

The "jaws" 19 and 21 are capable of being expanded. That is to say, I may make the size of the screw holes or slits in the casing 1 (or in the vertical portions of the flanges 19 and 21) sufficiently large so that each of the jaws or flanges 19 and 21 may be moved a limited distance with respect to the other. Similarly, as shown more clearly in Figs. 2 and 3, the slots or holes in which the vertically extending clamping screws 27, 27' are seated have length and width dimensions sufficiently large to permit the arm 15 (and hence the tube support 13 or 13a, 13b, etc.) to be moved in all directions in a plane perpendicular to the axis of symmetry Z—Z of the system.

In setting up the apparatus of my invention, I prefer first to orient the supporting ring 13, or the supporting points 13a, etc., in a horizontal plane with respect to the axis of symmetry Z—Z, and to thereafter adjust the said tube supports in the vertical direction by moving the flanges 19 and 21, or one of them, upwardly or downwardly as the case may be. Exceedingly small variations in the vertical adjustment of the light generating surface 5 of the tube 3 with respect to the mirror 5 to provide for focusing may be achieved by the use of washers or shims 29 interposed between the flanges 19 and 21 and the flat end-portion 15' of the supporting arm or arms 15.

When the support or supports 13 have been correctly positioned in the horizontal and vertical directions, I may orient the light generating surface 5 of the tube 3 with respect to the center of the mirror 7 by tilting the tube, when necessary or desirable, to bring its long axis into or out of register with the axis of symmetry Z—Z of the system. I provide three elongated helical springs 31a, 31b, 31c, which may be spaced 120° apart, for maintaining the tube in its adjusted position on or in its "cradle" or support 13. As shown more clearly in Fig. 1, one end of each spring is affixed to the socket base 33 of the tube and the other end is secured to eyelets 35 at the "upper" end of the casing 1. It will be appreciated by those skilled in the art to which my invention appertains that the presence of the ring 13 or the supports 13a, 13b, and 13c and the springs 31a, 31b and the like, apparently in the path of the light, in no wise affects the quality of the ultimate image, though they may cause a negligible decrease in the intensity of the light rays of which the said image is comprised.

From the foregoing it will be seen that, in accordance with the invention, an image projection system having a positioning support for the principal optical parts and a novel cathode ray tube support is provided. The tube support is adjustable and cooperates with the optical features of the system in such a way that a tube having a target face of predetermined configuration such that it serves as an object field for the system may be accurately placed in position by the mere act of seating it upon the support. The curvature of the object field is determined by at least three points on the tube holder and may be determined by the circular periphery of a ring member as shown in Fig. 1 of the drawing.

Figure 5:
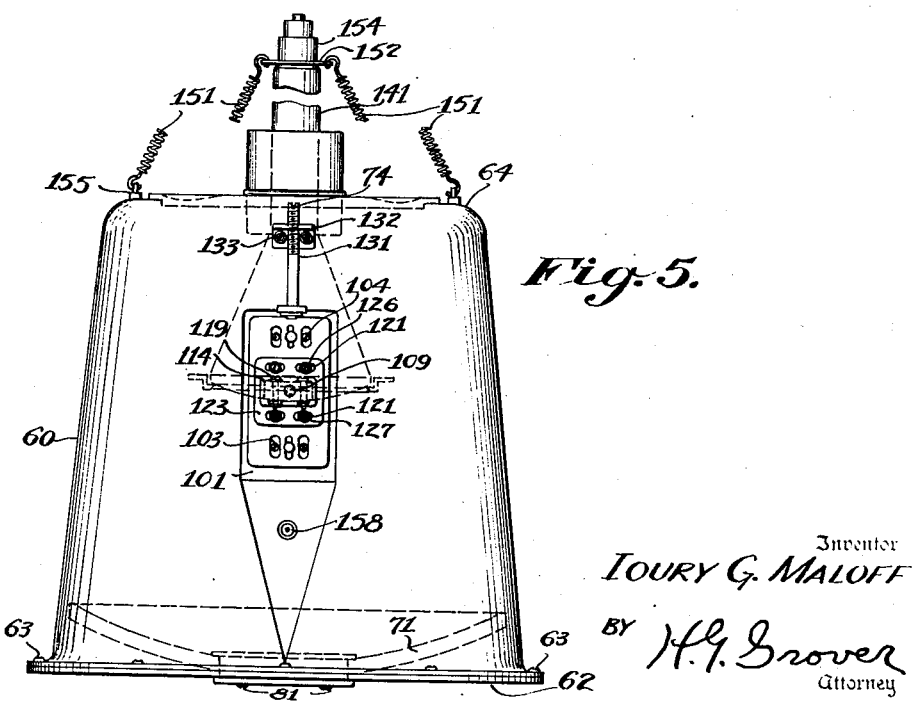
Fig. 5 is an elevational view of the structure of Fig. 4.

Figs. 4, 5 and 6, show an arrangement of the optical projection system of this invention in a preferred form. In accordance with the invention, and as shown in these figures of the drawing, means cooperating with the tube support are provided for furnishing the relatively high polarizing voltage to the second anode of the associated cathode ray tube.

Referring now to Fig. 4 and also to Figs. 5 and 6 when necessary for clarity for a detailed description of the illustrative embodiment of a preferred arrangement, reference character 60 indicates the general foundation member of the supporting structure and will be referred to hereinafter for the sake of convenience as a "barrel." One end of the barrel is closed by a disc member or circular plate 62 removably secured thereon by suitable fastening means, such as screws 63. The end 64 of the barrel 60 opposite the closure member 62 is recessed to provide a resting surface or seat 66 for the correcting lens 67. This seat is normal to the axis of the barrel. The shoulder 69 of the recess is co-axial with the barrel 60 whereby other elements of the system may be accurately located with respect to the correcting lens.

A mirror 71 having a spherical reflecting surface 72 is secured to the closure member 62, for example. In the illustrative arrangement, the mirror 71 is held firmly in position and in desired co-axial alignment with respect to the correcting lens by a circular clamping member 74 and a clamping disc 76. The clamping member 74 rests in a centrally located aperture 75 in the mirror 71, and a washer or gasket 77 of yieldable material is interposed between the clamping flange 78 and the surface of the mirror 71. Securing means, such as clamping screws 81, passing through apertures in the member 76 and circumferentially spaced bosses 82 on the inner periphery of the member 74 serve to maintain the mirror 71 and the clamping parts 74 and 76 in position. It will be understood that the mirror may be fixed and the correcting lens adjusted with respect to the mirror. This is an equivalent construction in accordance with the invention.

A replacable image producing tube 84 having a target face 86 projects the luminous image formed on this target face toward the spherical reflecting surface 72 of the mirror 71. The target face of the tube is substantially spherical, or is exactly spherical for reasons already discussed, and this target face forms an object field of the projection system where a suitably located projection screen (not shown) is flat so that the system has a flat image field.

In accordance with the invention, this tube is accurately positioned upon installation in the projection system in accordance with the invention by providing a tube support 88 having a central aperture 91 which is beveled as indicated at 93 to provide a circular tube seat 94 for the spherical target face 86 of the tube. To provide for initial adjustment of the position of the ring 94, the tube support 88 is adjustably carried by the barrel 60.

So that adjustment of the position of the member 88 may be obtained conveniently, even though it is done infrequently and perhaps once only at the factory, an illustrative arrangement of preferred form in accordance with the invention is shown in greater detail than in Figs. 1 to 3. The member 88 is secured to a supporting arm 96 by suitably fastening means such as a bolt or bolts 98. In accordance with one aspect of the invention later to be described, the arm 96 is preferably of electrical insulating material, but it will be understood that any material such as metal suitable for the purpose may be employed where only a supporting function and no electrical insulating function is to be performed. The exterior wall of the barrel 60 is formed to present a flattened surface 101 against which a plate 102 is slidably mounted. Provision for sliding movement for the plate 102 may be obtained by slotting the plate as indicated at 103, so that it may slide axially of the barrel on shouldered securing bolts 104.

The end of the member 96 opposite the tube supporting member 88 is slidably received in a member 106. The end of the supporting arm 96 may, conveniently, be rectangular, in which event the member 106, to conform to the shape of the arm, will also be rectangular. A threaded hole 108 receives an adjusting screw 109 which passes through an aperture 111 in a cap member 114. The shoulder beneath the head of the adjusting screw 109 contacts the outer surface of the cap member 114 when the screw is turned to move the supporting arm 96 longitudinally. Opposite walls of the member 106 are slotted, as indicated at 116, and the arm 96 is apertured to accommodate a clamping bolt or bolts 119.

The member 106 is mounted upon the plate 102 so as to be slidable laterally thereof and at right angles to the axis of the barrel 60. As shown in Fig. 5 of the drawings, this is accomplished by providing slots 121 in the flange 123 of the member 106 to receive clamping bolts 125. These bolts are engaged in apertures 127 in the plate 103, and they are accommodated in an opening 128 in the flat section 101 of the barrel.

To provide for moving the plate 102 axially of the barrel for focusing the projected image, a focusing screw 131 is threadedly engaged in an aperture in a bracket 132 secured to the barrel 60 by suitable fastening means 133. The free end of the focusing screw 131 is rotatable in an aperture 134 in a flange 136 of the plate 102. A snap ring washer 138 or the like constrains the plate 102 to move longitudinally as the screw 131 is turned for adjustment.

The free end of the neck 141 of the tube 84 projects upwardly through an aperture 144 in the correcting lens, and this aperture may be large enough to accommodate a deflecting yoke 146. A dust proof washer or packing 148 prevents entry of dust around the neck of the tube or deflecting yoke.

The tube is maintained against the circular supporting edge 94 of the member 88 by helical springs 151 which are similar in function to the springs 31a, 31b, and 31c, of Fig. 1 of the drawings. These springs are engaged with a ring-like yoke 152 which is slipped over the base 154 of the tube to rest against its glass neck or to be mounted on the tube in any suitable manner. Suitable anchorages, such as brackets 155, one for each spring or rod, are provided on the barrel end 64. It will be understood that other means, such as rods having turnbuckles interposed in their length, may be employed for this purpose.

As stated above, a connection for the high polarizing voltage for the second anode of the tube 84 may be conveniently provided for in a safe manner by forming the arm 96 of a suitable insulating material such as "Mycalex." A terminal lug 156 for a high voltage cable 158 is clamped by the bolt 98, and another terminal lug 159, also held by the bolt 98, receives a short insulated lead 161 which connects to the second anode connection 163 of the tube 84. The bolt thus serves as an electrical conductor. However, other conductive means may bridge the cable 158 and the lead 161.

Having now described the invention, what is claimed and desired to be secured by Letters Patent is the following:

1. A mounting for an electron image-tube in a projection device comprising a housing, a pair of optical members in said housing each optical member of the pair being positioned adjacent an end of said housing, an electron image-tube having a surface comprising a window cooperating with said optical members, supporting means for the electron image tube comprising a mount for supporting said tube, said supporting means projecting inwardly from a wall of said casing, said mount having engagement with said surface of said electron image tube to position the same axially of said casing and being in the form of an annulus beveled to permit passage of available light to one of the optical elements serving as a light receiving element, and means for exerting pressure on said electron image tube axially of said housing in the direction of said mount so as to maintain said image tube in a position in said housing with respect to said optical members to effect an optimum light path length between the elements.

2. In a projector for projecting luminous images produced by a cathode ray tube, a spherical mirror, a spherical aberration correcting lens, a barrel having means at one end thereof to provide a mounting for the spherical aberration correcting lens, means in said barrel for mounting said mirror accurately with respect to said correcting lens, a support, means on said barrel whereby the position of said support with respect to the axis of symmetry of the mirror and the correcting lens may be established, a holder for a cathode ray tube carried by said support, said holder having means defining at least three points on the curved target face of a cathode ray tube, and resilient means associated with said barrel constructed and arranged to press the target face of the tube into contact with the point defining means.

3. In a projector for projecting luminous images produced by a cathode ray tube, a spherical mirror, a spherical aberration correcting lens, a barrel having means at one end thereof to provide a mounting for the spherical aberration correcting lens, means in the end of said barrel opposite said correcting lens for mounting said mirror accurately with respect to said correcting lens, a support, a holder for a cathode ray tube carried by said support, said holder having means defining at least three points on the curved target face of a cathode ray tube, means on said barrel for moving said support axially of said barrel and said holder along the axis of said barrel to provide a focusing adjustment, and extendable means associated with said barrel constructed and arranged to press the target face of the tube into contact with the point defining means.

4. An image projector for projecting a luminous image produced on the target area of a cathode ray tube comprising a barrel, a correcting lens, one end of said barrel being recessed to provide a seat for the correcting lens normal to the axis of the barrel with the wall of the recess coaxial with the barrel, a spherical mirror, means at the end of said barrel opposite said seat for supporting said spherical mirror in a desired position with respect to said correcting lens, a support, a connection for said support to said barrel whereby the position of said support with respect to the axis of symmetry of said mirror and said correcting lens may be established, a holder for a cathode ray tube carried by said support, said holder having means defining at least three points on the curved target face of a cathode ray tube, and means connected to said barrel for maintaining the target face of a tube on said holder.

5. In a projector for projecting luminous images produced by a cathode ray tube, a spherical mirror, a spherical aberration correcting lens, said mirror and said lens being spaced from each other whereby light from said mirror is directed through said correcting lens toward an image viewing screen, a support, means whereby the position of said support with respect to the axis of symmetry of said mirror and said correcting lens may be established, a holder for a cathode ray tube carried by said support, said holder being electrically conductive, an electrical connection to said tube holder, and means connected to said holder to serve as an electrical connector for said tube.

IOURY G. MALOFF.

REFERENCES CITED

The following references are of record in the file of this patent:

UNITED STATES PATENTS

| Number | Name | Date |
|---|---|---|
| 995,275 | Miller | June 13, 1911 |
| 1,080,882 | Beck | Dec. 9, 1913 |
| 1,111,093 | Preddey | Sept. 22, 1914 |
| 2,161,368 | McLeod | June 6, 1939 |
| 2,165,779 | Blain | July 11, 1939 |
| 2,273,801 | Landis | Feb. 17, 1942 |
| 2,285,278 | Hennessy | June 2, 1942 |
| 2,295,802 | Nicoll | Sept. 15, 1942 |
| 2,298,808 | Romberg | Oct. 13, 1942 |
| 2,415,211 | Law | Feb. 4, 1947 |

FOREIGN PATENTS

| Number | Country | Date |
|---|---|---|
| 309,334 | Italy | July 3, 1933 |
| 506,418 | Great Britain | Aug. 25, 1937 |
| 520,412 | Great Britain | Apr. 23, 1940 |